(12) United States Patent
Fujii

(10) Patent No.: US 11,136,211 B2
(45) Date of Patent: Oct. 5, 2021

(54) IMAGE SCANNER

(71) Applicant: BROTHER KOGYO KABUSHIKI KAISHA, Nagoya (JP)

(72) Inventor: Isamu Fujii, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 315 days.

(21) Appl. No.: 16/424,601

(22) Filed: May 29, 2019

(65) Prior Publication Data
US 2019/0367315 A1    Dec. 5, 2019

(30) Foreign Application Priority Data

May 31, 2018    (JP) .............................. JP2018-104449

(51) Int. Cl.
*B65H 29/50*    (2006.01)
*B65H 7/02*    (2006.01)
(Continued)

(52) U.S. Cl.
CPC ............... *B65H 29/50* (2013.01); *B65H 1/04* (2013.01); *B65H 1/14* (2013.01); *B65H 1/18* (2013.01); *B65H 3/0684* (2013.01); *B65H 7/02* (2013.01); *H04N 1/00588* (2013.01); *H04N 1/00602* (2013.01); *H04N 1/00702* (2013.01); *B65H 2301/4212* (2013.01); *B65H 2404/1521* (2013.01); *B65H 2405/3321* (2013.01); *B65H 2511/22* (2013.01); *B65H 2513/40* (2013.01); *B65H 2553/30* (2013.01); *B65H 2557/512* (2013.01); *B65H 2801/39* (2013.01)

(58) Field of Classification Search
CPC ........ B65H 3/0684; B65H 29/50; B65H 1/18; B65H 2405/3321; B65H 1/14; H04N 1/00631
See application file for complete search history.

(56) References Cited

U.S. PATENT DOCUMENTS

| 7,564,600 B2 * | 7/2009 | Shoji .................. H04N 1/00631 358/498 |
| 10,554,834 B2 * | 2/2020 | Oyama .................. B65H 29/50 |

(Continued)

FOREIGN PATENT DOCUMENTS

| JP | H10-167545 A | 6/1998 |
| JP | 2005-008283 A | 1/2005 |
| JP | 4662551 A | 3/2011 |

*Primary Examiner* — Jeremy R Severson
(74) *Attorney, Agent, or Firm* — Scully, Scott, Murphy, Presser, PC

(57) ABSTRACT

An image scanner is configured to perform: controlling the sheet feed roller to feed the document supported on the sheet feed tray, controlling the conveyor to convey the fed document to the reading position, controlling the image sensor to read the image of the document at the reading position, and controlling the sheet discharge unit to discharge the read document to the sheet discharge tray; in response to detecting, by the sheet feed sensor, a state change from the first state to the second state, moving the movable plate upward until the sheet feed roller changes from the second state to the first state; after moving the movable plate, controlling the distance sensor to detect the document distance; and moving the sheet discharge unit vertically based on the detected document distance.

6 Claims, 9 Drawing Sheets

(51) Int. Cl.
   *B65H 1/18*     (2006.01)
   *H04N 1/00*     (2006.01)
   *B65H 3/06*     (2006.01)
   *B65H 1/14*     (2006.01)
   *B65H 1/04*     (2006.01)

(56) References Cited

U.S. PATENT DOCUMENTS

| | | | |
|---|---|---|---|
| 10,737,896 B2* | 8/2020 | Ito | B65H 29/14 |
| 10,793,387 B2* | 10/2020 | Shigeno | B65H 29/14 |
| 10,800,630 B2* | 10/2020 | Fujiwara | H04N 1/00602 |
| 10,841,440 B2* | 11/2020 | Miwa | H04N 1/00615 |
| 10,841,444 B2* | 11/2020 | Fujiwara | H04N 1/00591 |
| 10,865,065 B2* | 12/2020 | Ito | H04N 1/00689 |
| 10,939,005 B2* | 3/2021 | Miwa | B65H 31/02 |
| 10,961,074 B2* | 3/2021 | Miwa | B65H 5/36 |
| 2008/0029950 A1 | 2/2008 | Wada et al. | |
| 2020/0361736 A1* | 11/2020 | Ito | B65H 1/14 |

* cited by examiner

IMAGE SCANNER

CROSS REFERENCE TO RELATED APPLICATIONS

This application claims priority from Japanese Patent Application No. 2018-104449 filed May 31, 2018. The entire content of the priority application is incorporated herein by reference.

TECHNICAL FIELD

This disclosure relates to an image scanner.

BACKGROUND

A document feeder is known. The document feeder includes a sheet feed tray, a sheet discharge tray, a conveyor, and a reader. The sheet feed tray supports a document that is supplied. The sheet discharge tray is located below the sheet feed tray, and supports a document that is discharged. The conveyor conveys the document from the sheet feed tray toward the sheet discharge tray. The reader reads the document that is conveyed by the conveyor.

The sheet feed tray moves upward in response to a decrease of a number of sheets of documents supported on the sheet feed tray, and moves close to a document pickup portion. The document feeder further includes a swing conveyor. The swing conveyor has a sheet discharge port for discharging the document conveyed by a conveyance guide to the sheet discharge tray. The swing conveyor moves upward to separate the sheet discharge port away from the sheet discharge tray. Specifically, a link member is provided between the sheet feed tray and the swing conveyor, and the sheet discharge port of the swing conveyor moves up and down in response to upward and downward movement of the sheet feed tray.

SUMMARY

According to one aspect, this specification discloses an image scanner. The image scanner includes a sheet feed tray, a sheet feed roller, a sheet feed sensor, a conveyor, an image sensor, a sheet discharge unit, a sheet discharge tray, a distance sensor, and a controller. The sheet feed tray is configured to support a document. The sheet feed roller is configured to feed the document supported on the sheet feed tray. The sheet feed roller is configured to move vertically. The sheet feed tray includes a movable plate configured to move vertically relative to the sheet feed roller. The sheet feed sensor is configured to, by detecting a vertical position of the sheet feed roller, detect whether the sheet feed roller is in a first state in which the sheet feed roller is able to feed the document supported on the sheet feed tray or in a second state in which the sheet feed roller is unable to feed the document supported on the sheet feed tray. The conveyor is configured to convey the document fed by the sheet feed roller to a reading position. The image sensor is configured to read an image of the document that is conveyed by the conveyor and that is located at the reading position. The sheet discharge unit is disposed below the movable plate and configured to move vertically relative to the movable plate. The sheet discharge unit has a sheet discharge port. The sheet discharge unit is configured to discharge a document through the sheet discharge port. The sheet discharge tray is disposed below the sheet feed tray and has a document support surface configured to support the document discharged from the sheet discharge unit. The distance sensor is configured to detect a document distance that is a vertical distance between the document support surface and an uppermost document supported on the sheet discharge tray. The controller is configured to perform: controlling the sheet feed roller to feed the document supported on the sheet feed tray, controlling the conveyor to convey the fed document to the reading position, controlling the image sensor to read the image of the document at the reading position, and controlling the sheet discharge unit to discharge the read document to the sheet discharge tray; in response to detecting, by the sheet feed sensor, a state change from the first state to the second state, moving the movable plate upward until the sheet feed roller changes from the second state to the first state; after moving the movable plate, controlling the distance sensor to detect the document distance; and moving the sheet discharge unit vertically based on the detected document distance.

BRIEF DESCRIPTION OF THE DRAWINGS

Embodiments in accordance with this disclosure will be described in detail with reference to the following figures wherein.

DETAILED DESCRIPTION

In the above-described document feeder, if a document discharged through the sheet discharge port bends to be a so-called curled state, a document subsequently discharged through the sheet discharge port hits the curled document, which may cause a jam that the document becomes crumpled.

In view of the foregoing, an example of an object of this disclosure is to provide an image scanner configured to suppress an occurrence of jam even when a document discharged through a sheet discharge port is curled.

<Configuration of Image Scanner 1>

Figure 1:
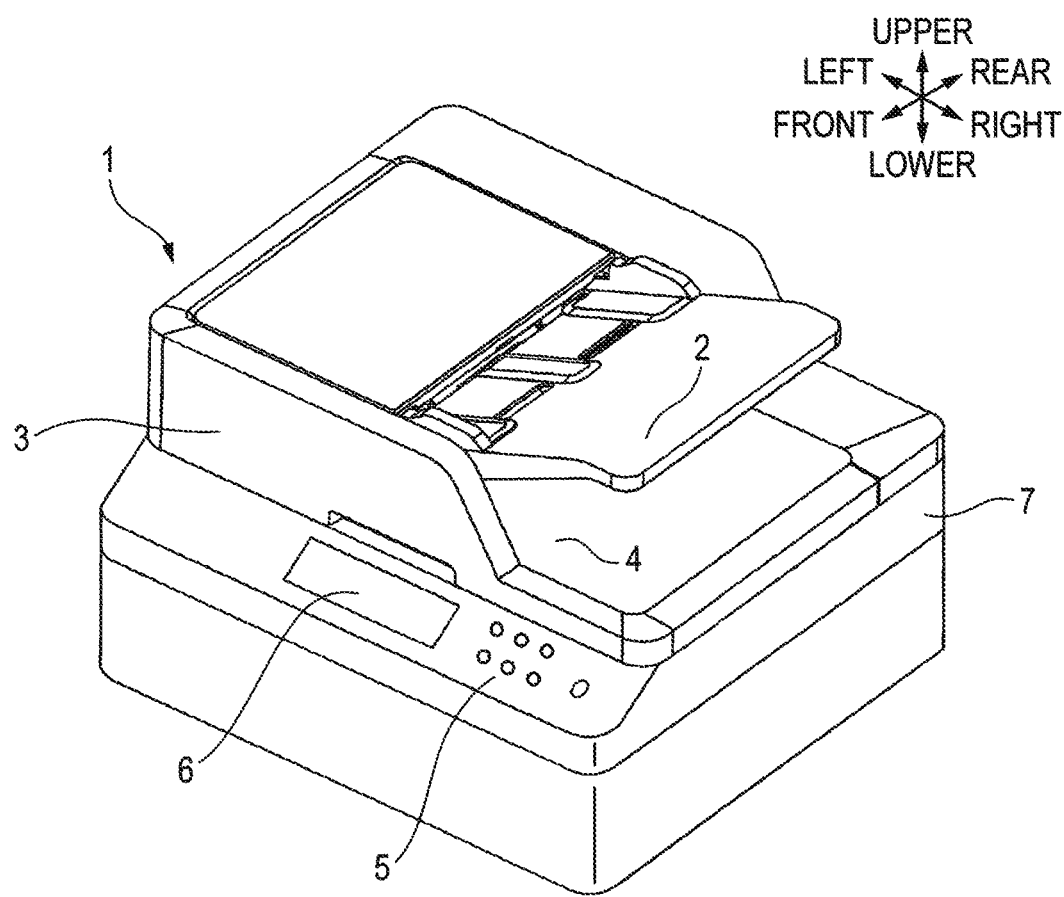
FIG. 1 is a perspective view of an image scanner according to an embodiment.
Figure 2:
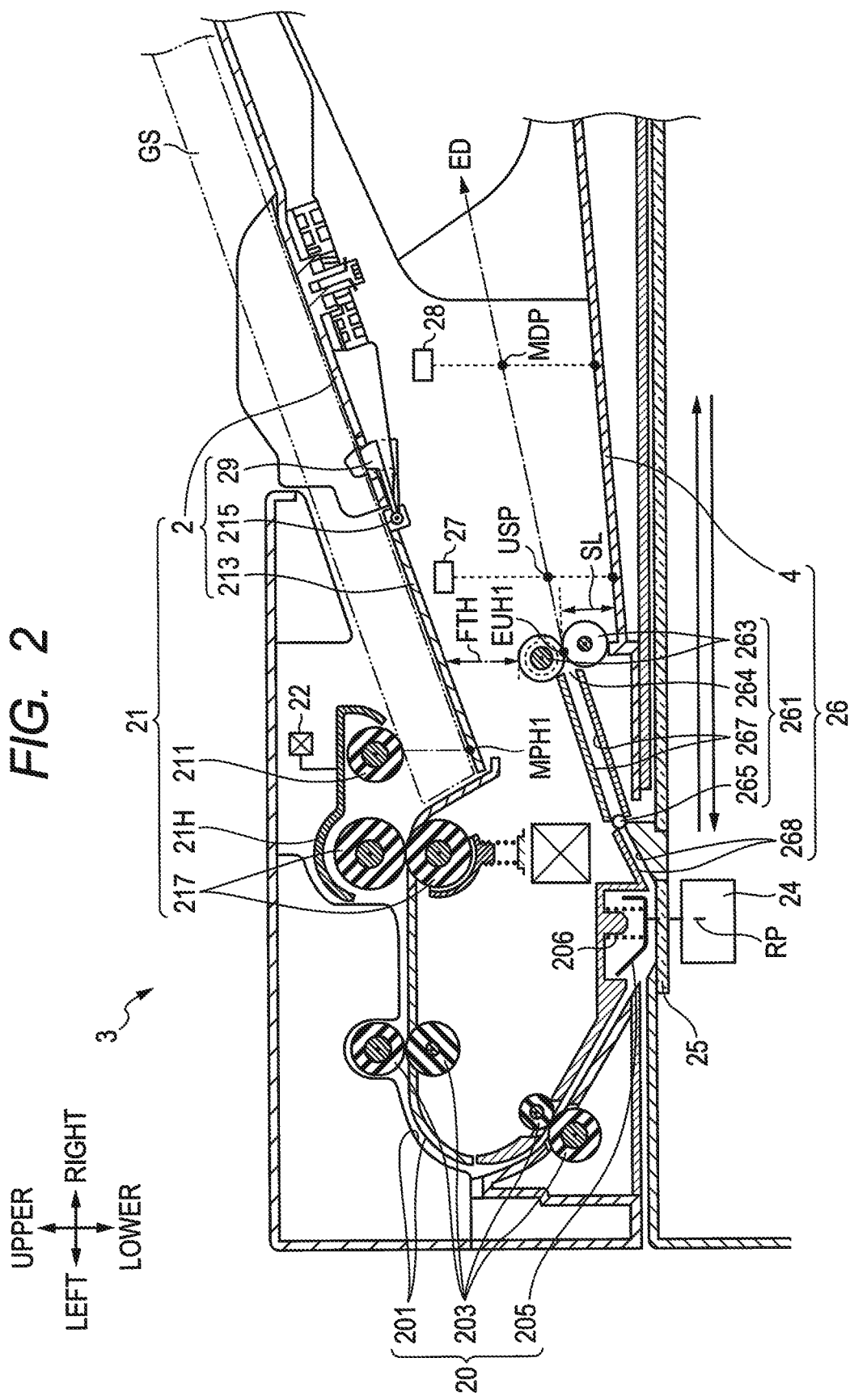
FIG. 2 shows an internal structure of an ADF unit in a state where a sheet feed tray supports documents GS.
Figure 3:
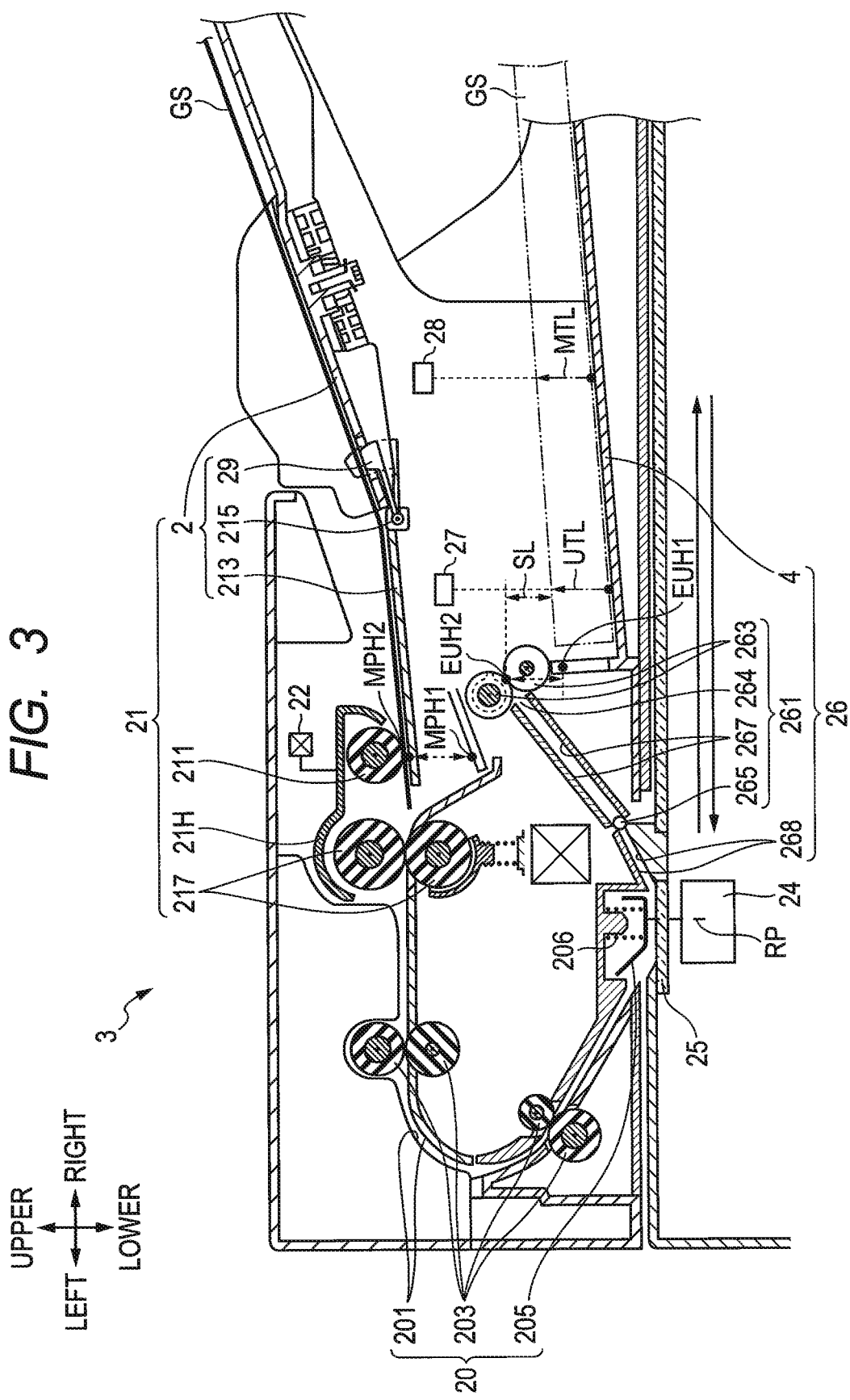
FIG. 3 shows an internal structure of the ADF unit in a state where a sheet discharge tray supports documents GS.

An image scanner 1 according to an embodiment will be described while referring to FIGS. 1, 2, and 3. In FIGS. 1, 2, and 3, an upper-lower direction that is a vertical direction, a left-right direction, and a front-rear direction are directions indicated by the arrows. The image scanner 1 of the present embodiment is a scanner apparatus of an auto document feeder type. The image scanner 1 includes an auto document feeder unit (hereinafter referred to as "ADF unit") 3 and a main body 7. An operation interface 5 and a display 6 are arranged on an upper surface of the main body 7. The operation interface 5 includes a power switch and various setting buttons, and receives operation commands and so on from a user. For example, the operation interface 5 includes a start button for instructing start of reading main processing, and so on. The display 6 includes an LCD (abbreviation of Liquid Crystal Display), and displays a status of the image scanner 1. The ADF unit 3 feeds a document GS supported on a sheet feed tray 2, and discharges the fed document GS to a sheet discharge tray 4.

The ADF unit 3 includes a sheet feeder 21, a conveyor 20, a sheet discharger 26, and so on. The sheet feeder 21 includes the sheet feed tray 2, a sheet feed roller 211, and separation rollers 217. Due to rotation of a conveyance motor MT described later, the sheet feed roller 211 feeds documents GS supported on the sheet feed tray 2 to the separation rollers 217. Due to rotation of the conveyance motor MT described later, the separation rollers 217 separates the documents GS fed from the sheet feed roller 211 to one sheet at a time, and conveys the separated sheet to the conveyor 20. A sheet feed sensor 22 is connected to the sheet feed roller 211. The sheet feed sensor 22 is configured to turn on when the sheet feed roller 211 becomes a state where the sheet feed roller 211 is able to feed a document GS supported on the sheet feed tray 2, and to turn off when the sheet feed roller 211 becomes a state where the sheet feed roller 211 is unable to feed the document GS supported on the sheet feed tray 2. In the present embodiment, by moving a movable plate (swing plate) 213 described later vertically, the sheet feed roller 211 is moved vertically. By detecting a vertical position of the sheet feed roller 211 by using the sheet feed sensor 22, it is determined whether the sheet feed roller 211 is able to feed the document GS or is unable to feed the document GS.

More specifically, the sheet feed roller 211 is rotatably supported by a holder 21H that is swingably movable about the rotational axis of the upper separation roller 217, and thus the sheet feed roller 211 is configured to move vertically. When the movable plate 213 that supports the document GS is moved upward, the upper surface of the document GS contacts the sheet feed roller 211 and pushes the sheet feed roller 211 upward, and thus the sheet feed roller 211 is moved upward. The sheet feed sensor 22 detects the position of the sheet feed roller 211. When the sheet feed roller 211 is higher than or equal to a particular height, it is determined that the sheet feed roller 211 is able to feed the document GS (first state). When the sheet feed roller 211 is lower than the particular height, it is determined that the sheet feed roller 211 is unable to feed the document GS (second state).

The sheet feed tray 2 includes a front sensor 29, the movable plate 213, and a movable plate shaft 215. The front sensor 29 is configured to turn on when a document GS is supported on the sheet feed tray 2, and to turn off when no document GS is supported on the sheet feed tray 2. Due to rotation of a movable plate motor MPMT described later, the movable plate 213 swingably moves about the movable plate shaft 215 (the swing axis), and moves vertically relative to the sheet feed roller 211. Specifically, the movable plate 213 swingably moves about the movable plate shaft 215 (the swing axis), and moves from a first movable plate height MPH1 shown in FIG. 2 to a second movable plate height MPH2 shown in FIG. 3.

The conveyor 20 includes conveyance rollers 203, conveyance guides 201, and a document pressing plate 205. Due to rotation of the conveyance motor MT described later, the conveyance rollers 203 convey the document GS fed from the sheet feeder 21, along the conveyance guides 201, to a reading position RP at which the document pressing plate 205 is located.

The document pressing plate 205 is urged toward a transparent plate 25 by a spring 206. A reader (image sensor) 24 is disposed below the transparent plate 25. The reader 24 includes a CIS (abbreviation of Contact Image Sensor), and is configured to move in the left-right direction due to rotation of a reading motor RMT described later. The reader 24 reads the document GS urged toward the document pressing plate 205 at the reading position RP. The conveyance rollers 203 convey the document GS read by the reader 24 to the sheet discharger 26.

The sheet discharger 26 includes first sheet discharge conveyance guides 268, a sheet discharge unit 261, and the sheet discharge tray 4. The sheet discharge unit 261 includes second sheet discharge conveyance guides 267, sheet discharge rollers 263, a sheet discharge unit shaft 265, and a sheet discharge port 264. Due to rotation of the conveyance motor MT described later, the conveyance rollers 203 convey the document GS read by the reader 24 toward the sheet discharge rollers 263 along the first sheet discharge conveyance guides 268 and the second sheet discharge conveyance guides 267. Due to rotation of the conveyance motor MT described later, the sheet discharge rollers 263 discharge the document GS conveyed by the conveyor 20 to the sheet discharge tray 4. The sheet discharge tray 4 supports the document GS discharged by the sheet discharge rollers 263. The sheet discharge tray 4 is disposed below the sheet feed tray 2. The sheet discharge unit 261 is disposed below the movable plate 213. The sheet discharge rollers 263 are arranged at the sheet discharge port 264 through which the document GS to be discharged passes.

Due to rotation of a sheet discharge unit motor EUMT described later, the sheet discharge unit 261 swingably moves about the sheet discharge unit shaft 265 (the swing axis), and moves vertically relative to the movable plate 213. Specifically, the sheet discharge unit 261 swingably moves about the sheet discharge unit shaft 265 (the swing axis), and moves from a first sheet discharge unit height EUH1 shown in FIG. 2 to a second sheet discharge unit height EUH2 shown in FIG. 3.

The ADF unit 3 includes an upstream distance sensor 27 and a middle distance sensor 28 above the sheet discharge tray 4. As shown in FIG. 2, a sheet discharge direction ED is a direction in which the sheet discharge rollers 263 discharge a document GS in a state where the sheet discharge unit 261 is located at the first sheet discharge unit height EUH1. The upstream distance sensor 27 is disposed above an upstream position USP. The upstream position USP is a position that is separated by a particular distance from the sheet discharge rollers 263 along the sheet discharge direction ED. In the present embodiment, the particular distance is "20 mm".

As shown in FIG. 3, the upstream distance sensor 27 detects an upstream document distance UTL at the upstream position USP. Specifically, the upstream distance sensor 27 detects, as the upstream document distance UTL, a vertical distance from a document support surface of the sheet discharge tray 4 that supports a document GS to an uppermost document GS supported on the sheet discharge tray 4 at the upstream position USP. For example, the upstream distance sensor 27 may be a distance sensor such as an ultrasonic sensor and an infrared sensor. For example, a relation between distances and sensor output voltages is stored as a table, so that the upstream document distance UTL is determined from the sensor output voltage. The middle distance sensor 28 has a similar configuration.

The middle distance sensor 28 is disposed above a middle position MDP vertically. The middle position MDP is a position separated from the sheet discharge rollers 263 along the sheet discharge direction ED by a half of a particular length. In the present embodiment, the particular length is a length in a longitudinal direction of the A4 size, for example. In the present embodiment, the document GS has the A4 size, for example.

As shown in FIG. 3, the middle distance sensor 28 detects a middle document distance MTL at the middle position MDP. Specifically, the middle distance sensor 28 detects, as the middle document distance MTL, a vertical distance from the document support surface of the sheet discharge tray 4 that supports a document GS to the uppermost document GS supported on the sheet discharge tray 4 at the middle position MDP.

<Electrical Configuration of Image Scanner 1>

Figure 4:
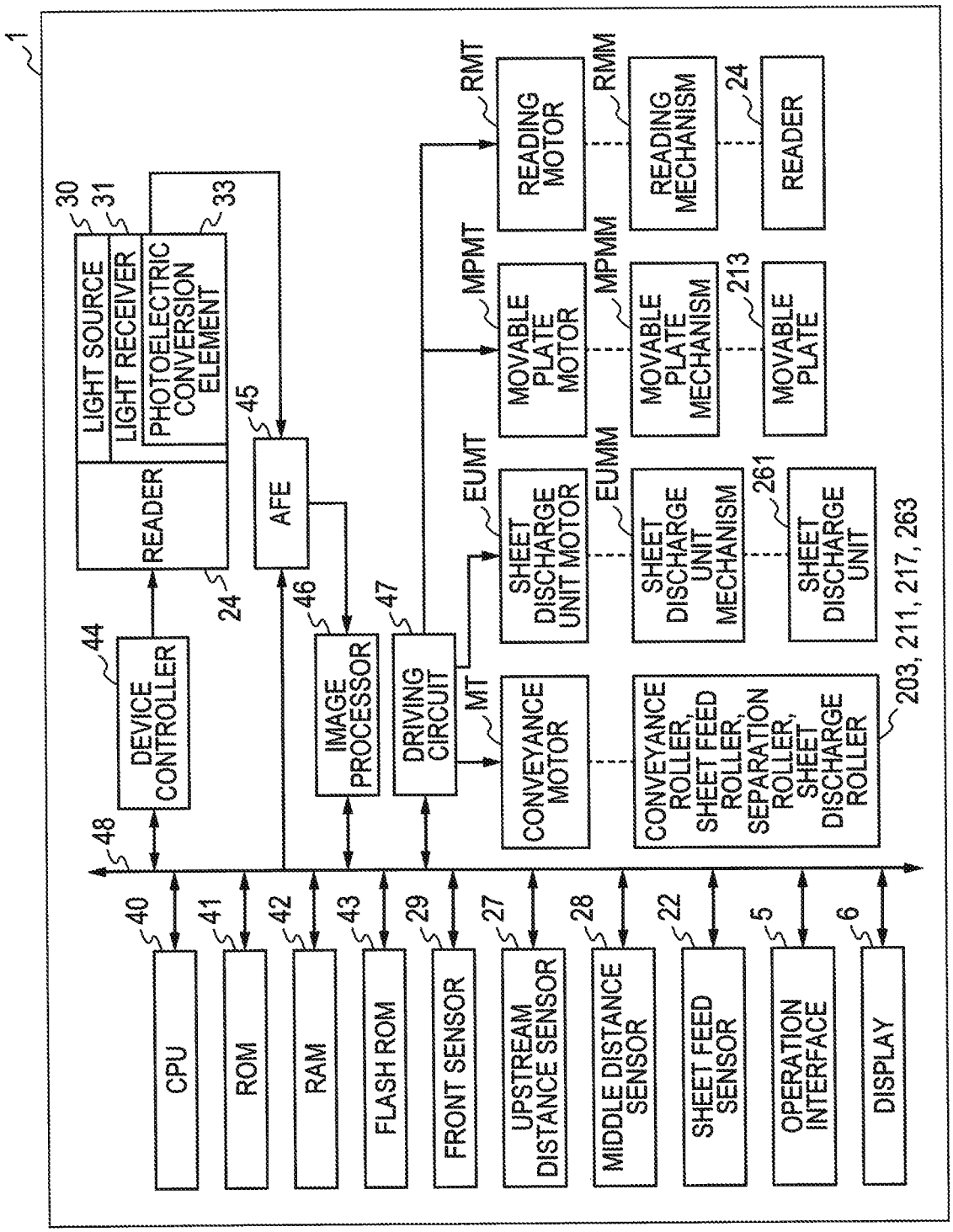
FIG. 4 is a block diagram showing an electrical configuration of the image scanner.

The electrical configuration of the image scanner 1 will be described while referring to FIG. 4. In FIG. 4, the image scanner 1 includes, as main elements, a CPU 40, a ROM 41, a RAM 42, a flash ROM 43, a device controller 44, an analog front end (hereinafter referred to as "AFE") 45, an image processor 46, and a driving circuit 47. The elements are connected to the operation interface 5, the display 6, the front sensor 29, the upstream distance sensor 27, and the middle distance sensor 28 through a bus 48. The operation interface 5 includes a plurality of keys such as a start button and a determination (enter) button. By operating the operation interface 5, the user inputs various instructions to the image scanner 1. The display 6 is for displaying various kinds of information. The front sensor 29 turns on when a document GS is supported on the sheet feed tray 2, and turns off when no document GS is supported on the sheet feed tray 2. The upstream distance sensor 27 detects the upstream document distance UTL (FIG. 3) at the upstream position USP (FIG. 2). The middle distance sensor 28 detects the middle document distance MTL (FIG. 3) at the middle position MDP (FIG. 2).

The ROM 41 stores programs for allowing the image scanner 1 to execute various operations such as reading main processing (to be described later) and sub-routine processing in each main processing. The CPU 40 controls the respective units in accordance with programs read out from the ROM 41. The flash ROM 43 is a reprogrammable nonvolatile memory, and stores various data generated by control processing by the CPU 40, for example, initial values that are set in initialization processing, and so on. The RAM 42 temporarily stores the calculation results generated by control processing by the CPU 40, and so on.

The device controller 44 is connected to the reader 24, and transmits various signals based on instructions from the CPU 40. Specifically, the device controller 44 transmits, to a light source 30, signals for controlling the light source 30. Based on instructions from the CPU 40, the device controller 44 transmits, to a light receiver 31, a serial-in signal SI for simultaneously transferring electrical signals from a large number of photoelectric conversion elements 33 to an analog shift register and a clock signal CLK for sequentially outputting electrical signals from the analog shift register. Upon receiving these signals from the device controller 44, the reader 24 turns on the light source 30 and transmits, to the AFE 45, analog data corresponding to the amounts of light received by the light receiver 31.

The AFE 45 is connected to the reader 24 and, based on instructions from the CPU 30, converts analog data transmitted from the reader 24 into digital data DD that is 8-bit gradation data. The digital data DD converted by the AFE 45 is transmitted to the image processor 46.

The image processor 46 converts the digital data DD into gradation values GV. Specifically, the image processor 46 converts the digital data DD into the gradation values GV by performing black correction on the digital data DD and performing white correction on the data on which black correction has been performed. The gradation values GV are stored in the RAM 42 through the bus 48.

The driving circuit 47 is connected to the reading motor RMT, the conveyance motor MT, the sheet discharge unit motor EUMT, and the movable plate motor MPMT, and drives the reading motor RMT, the conveyance motor MT, the sheet discharge unit motor EUMT, and the movable plate motor MPMT to rotate based on drive commands from the CPU 40. When the reading motor RMT rotates by a particular reading amount, a reading mechanism RMM rotates by a particular reading angle, and the reader 24 moves by a particular reading distance. When the conveyance motor MT rotates by a particular amount, each of the conveyance rollers 203, the sheet feed roller 211, the separation rollers 217, and the sheet discharge rollers 263 rotates by a particular angle, and the document GS is conveyed by a particular distance along the conveyance guides 201 and the sheet discharge conveyance guides 268, 267. When the sheet discharge unit motor EUMT rotates by a particular sheet discharge unit amount, a sheet discharge unit mechanism EUMM rotates by a particular sheet discharge unit angle, and the sheet discharge unit 261 moves by a particular sheet discharge unit distance. When the movable plate motor MPMT rotates by a particular movable distance, a movable plate mechanism MPMM rotates by a particular movable angle, and the movable plate 213 moves by a particular movable distance.

<Operations of Image Scanner 1>

<Reading Main Processing>

Next, operations of the image scanner 1 will be described while referring to the drawings. The image scanner 1 mainly performs reading main processing of reading a document GS. Processing R1 to processing R6 in the reading main processing shown in FIG. 5 are executed by the CPU 40.

Figure 5:
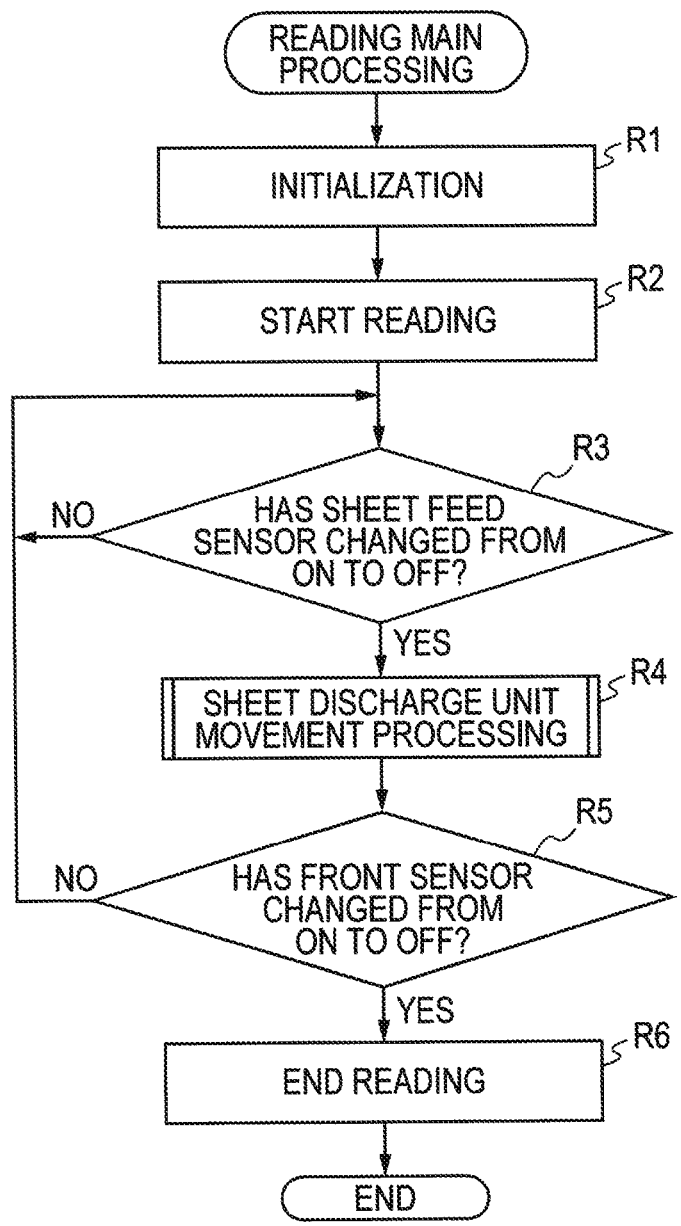
FIG. 5 is a flowchart showing reading main processing.

The reading main processing shown in FIG. 5 is started when a user places a document GS on the sheet feed tray 2 and presses the start button of the operation interface 5 in a state where a document GS is removed from the sheet discharge tray 4. That is, the CPU 40 starts the reading main processing in response to receiving a press command indicating that the start button of the operation interface 5 has been pressed when the upstream distance sensor 27 detects "0 mm" as the upstream document distance UTL and the front sensor 29 is on.

The CPU 40 initializes the device controller 44, the AFE 45, the image processor 46, the driving circuit 47, and so on (R1). Specifically, the CPU 40 transmits a drive command to the driving circuit 47 and controls the movable plate motor MPMT to rotate until the sheet feed sensor 22 is turned on so as to move the movable plate 213 upward, and controls the movable plate motor MPMT to further rotate by an initial rotation number so as to move the movable plate 213 upward. The CPU 40 transmits a drive command to the driving circuit 47 so as to move the reader 24 to the reading position RP in the left-right direction. The CPU 40 sets setting values for reading a document GS to the device controller 44, the AFE 45, and the image processor 46. The CPU 40 sets "0 mm" to a previous document distance BTL. The CPU 40 sets "10 mm" to a reference distance SL. The CPU 40 sets "0 mm" to a variation distance FL. In the present embodiment, the initial rotation number is a rotation number for moving the movable plate 213 upward in the vertical direction by "5 mm" from the position of the movable plate 213 at which the sheet feed sensor 22 turns on with the sheet feed tray 2 fully loaded with documents GS. Here, a distance "10 mm" that is set as the initial value of the reference distance SL corresponds to a height from the document support surface of the sheet discharge tray 4 that supports a document GS to the sheet discharge rollers 263 (specifically, the nip position of the sheet discharge rollers 263) in a state where the sheet discharge unit 261 is located at the first sheet discharge unit height EUH1 as shown in FIG. 2.

The CPU 40 starts a reading operation (R2). Specifically, the CPU 40 starts the reading operation of transmitting commands to the driving circuit 47, the device controller 44, the AFE 45, and the image processor 46, controlling the sheet feed roller 211 to feed a document GS from the sheet feed tray 2, controlling the conveyance rollers 203 to convey the fed document GS, controlling the reader 24 to read the conveyed document GS, and controlling the sheet discharge rollers 263 to discharge the read document GS to the sheet discharge tray 4.

The CPU 40 determines whether the sheet feed sensor 22 has changed from ON to OFF (R3). The CPU 40 proceeds to processing R4 when the sheet feed sensor 22 has changed from ON to OFF (R3: Yes), and continues the reading operation when the sheet feed sensor 22 has not changed from ON to OFF (R3:No).

The CPU 40 executes sheet discharge unit movement processing (R4). The details will be described later, and an outline will be described here. The CPU 40 transmits a drive command to the driving circuit 47, and controls the sheet discharge unit 261 to move vertically.

The CPU 40 determines whether the front sensor 29 has changed from ON to OFF (R5). The CPU 40 proceeds to processing R6 when the front sensor 29 has changed from ON to OFF (R5: Yes), and returns to processing R3 when the front sensor 29 has not changed from ON to OFF (R5: No).

The CPU 40 ends the reading operation (R6). Specifically, the CPU 40 transmits commands to the driving circuit 47, the device controller 44, the AFE 45, and the image processor 46, ends the reading operation of reading the document GS, and discharges the document GS to the sheet discharge tray 4. The CPU 40 transmits a command to the driving circuit 47, controls the movable plate 213 to move to the first movable plate height MPH1, and controls the sheet discharge unit 261 to move to the first sheet discharge unit height EUH1. Upon ending the processing R6, the reading main processing ends.

<Sheet Discharge Unit Movement Processing R4>

Figure 6:
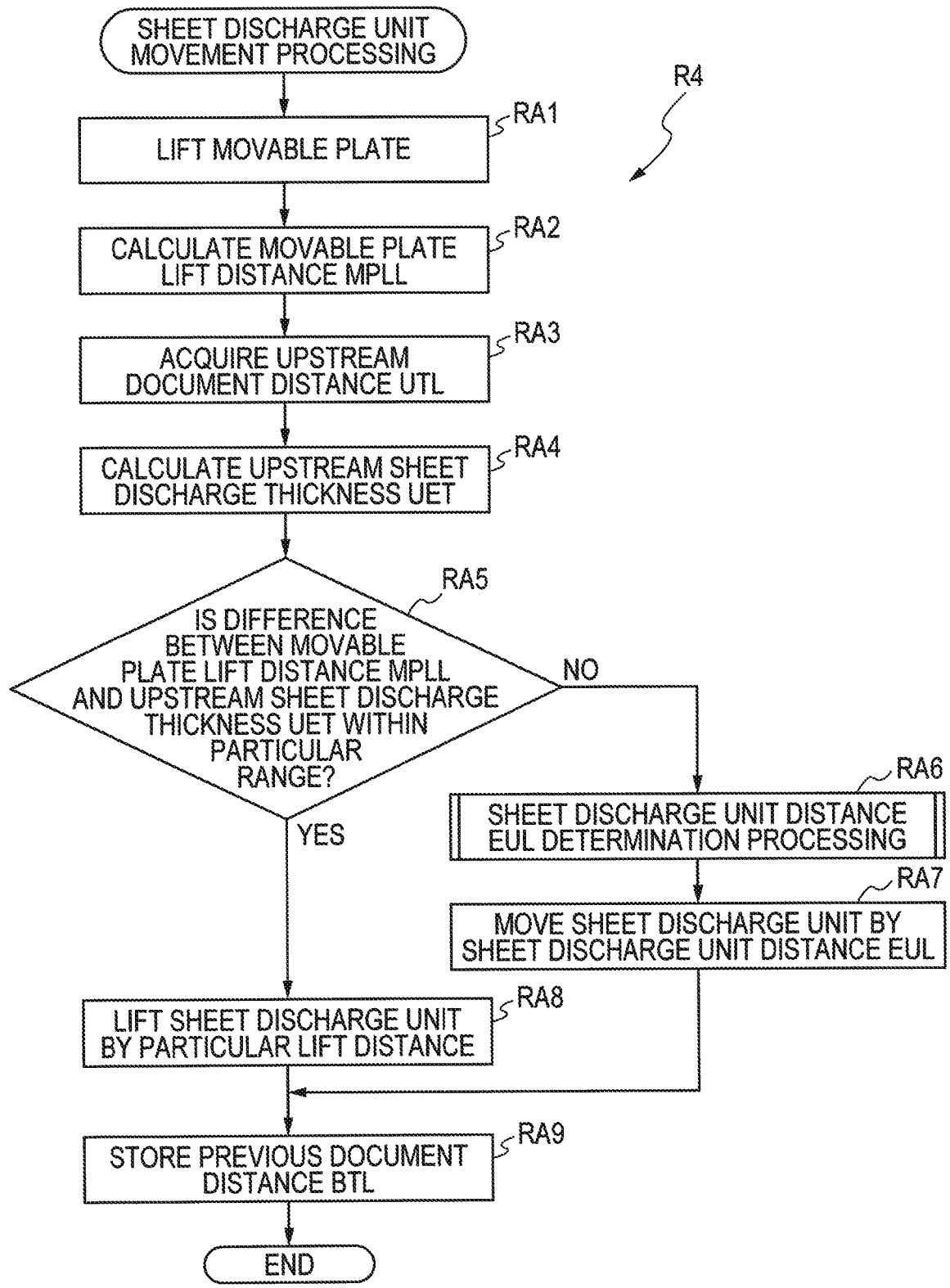
FIG. 6 is a flowchart showing sheet discharge unit movement processing R4.

Upon starting the sheet discharge unit movement processing R4 shown in FIG. 6, the CPU 40 causes the movable plate 213 to move upward (RA1). Specifically, the CPU 40 transmits a command to the driving circuit 47 so as to control the movable plate motor MPMT to rotate until the sheet feed sensor 22 turns on, and further control the movable plate motor MPMT to rotate by the initial rotation number, thereby moving the movable plate 213 upward. The CPU 40 stores, in the RAM 42, a rotation number that is obtained by adding the initial rotation number to a rotation number of rotations of the movable plate motor MPMT from when a positive determination is made in the processing R3 (R3: Yes) until when the sheet feed sensor 22 turns on, as a sheet feed rotation number PFRN. In the present embodiment, the initial rotation number is a rotation number for moving the movable plate 213 upward in the vertical direction by "5 mm" from the position of the movable plate 213 at which the sheet feed sensor 22 turns on with the sheet feed tray 2 fully loaded with documents GS. The distance "5 mm" is determined from the thickness of a number of sheets of documents GS that are fed continuously.

The CPU 40 calculates a movable plate lift distance MPLL (RA2). Specifically, the CPU 40 calculates a rotation angle of the movable plate 213 from the sheet feed rotation number PFRN, performs sine processing on the calculated rotation angle, and multiplies a value obtained by the sine processing by a length from the movable plate shaft 215 to a tip end of the movable plate 213, thereby calculating the movable plate lift distance MPLL. The movable plate lift distance MPLL is a vertical distance relative to the sheet feed roller 211, and is represented by mm (millimeters).

The CPU 40 acquires the upstream document distance UTL (RA3). Specifically, the CPU 40 causes the upstream distance sensor 27 to detect the upstream document distance UTL, and stores the acquired upstream document distance UTL in the RAM 42.

The CPU 40 calculates an upstream sheet discharge thickness UET (RA4). Specifically, the CPU 40 calculates the upstream sheet discharge thickness UET by subtracting the previous document distance BTL from the upstream document distance UTL.

The CPU 40 determines whether a difference between the movable plate lift distance MPLL and the upstream sheet discharge thickness UET is within a particular range (RA5). In response to determining that the difference between the movable plate lift distance MPLL and the upstream sheet discharge thickness UET is within the particular range (RA5:Yes), the CPU 40 advances the processing to processing RA8. In response to determining that the difference between the movable plate lift distance MPLL and the upstream sheet discharge thickness UET is not within the particular range (RA5:No), the CPU 40 advances the processing to processing RA6. In the present embodiment, the particular range is an amount of change of the vertical distance of the upper surface of the document GS when the document GS is normally discharged onto the sheet discharge tray 4. In the present embodiment, the particular range is "1 mm".

When a negative determination is made in the processing RA5 (RA5: No), the CPU 40 executes sheet discharge unit distance EUL determination processing (RA6). The details will be described later, and an outline will be described here. The CPU 40 determines a sheet discharge unit distance EUL.

The CPU 40 causes the sheet discharge unit 261 to move (RA7). Specifically, the CPU 40 transmits a command to the driving circuit 47, and controls the sheet discharge unit motor EUMT to rotate to move the sheet discharge unit 261 so that the sheet discharge rollers 263 (specifically, the nip position of the sheet discharge rollers 263) is located at a position separated upward in the vertical direction by the sheet discharge unit distance EUL from the document support surface of the sheet discharge tray 4. Upon ending the processing RA7, the CPU 40 advances the processing to the processing RA9.

When a positive determination is made in the processing RA5 (RA5: Yes), the CPU 40 causes the sheet discharge unit 261 to be moved (RA8). Specifically, the CPU 40 transmits a command to the driving circuit 47, and controls the sheet discharge unit motor EUMT to rotate so that the sheet discharge unit 261 is moved upward in the vertical direction by a particular lift distance. In the present embodiment, the particular lift distance is equal to the distance by which the movable plate 213 is moved upward after the sheet feed sensor 22 turns on in the processing RA1. In the present embodiment, the particular lift distance is "5 mm".

In this way, when the difference between the movable plate lift distance MPLL and the upstream sheet discharge thickness UET is within the particular range, the sheet discharge unit 261 is moved upward in the vertical direction by a predetermined particular distance. Thus, when the document is not curled, the sheet discharge unit 261 is moved more quickly than a case where the sheet discharge unit 261 is moved based on the document distance (the upstream document distance UTL or the middle document distance MTL).

Upon ending the processing RA7 and the processing RA8, the CPU 40 stores, in the RAM 42, the upstream document distance UTL acquired in the processing RA3 as the previous document distance BTL (RA9). Upon ending the processing RA9, the sheet discharge unit movement processing R4 ends.

<Sheet Discharge Unit Distance EUL Determination Processing RA6>

Figure 7:
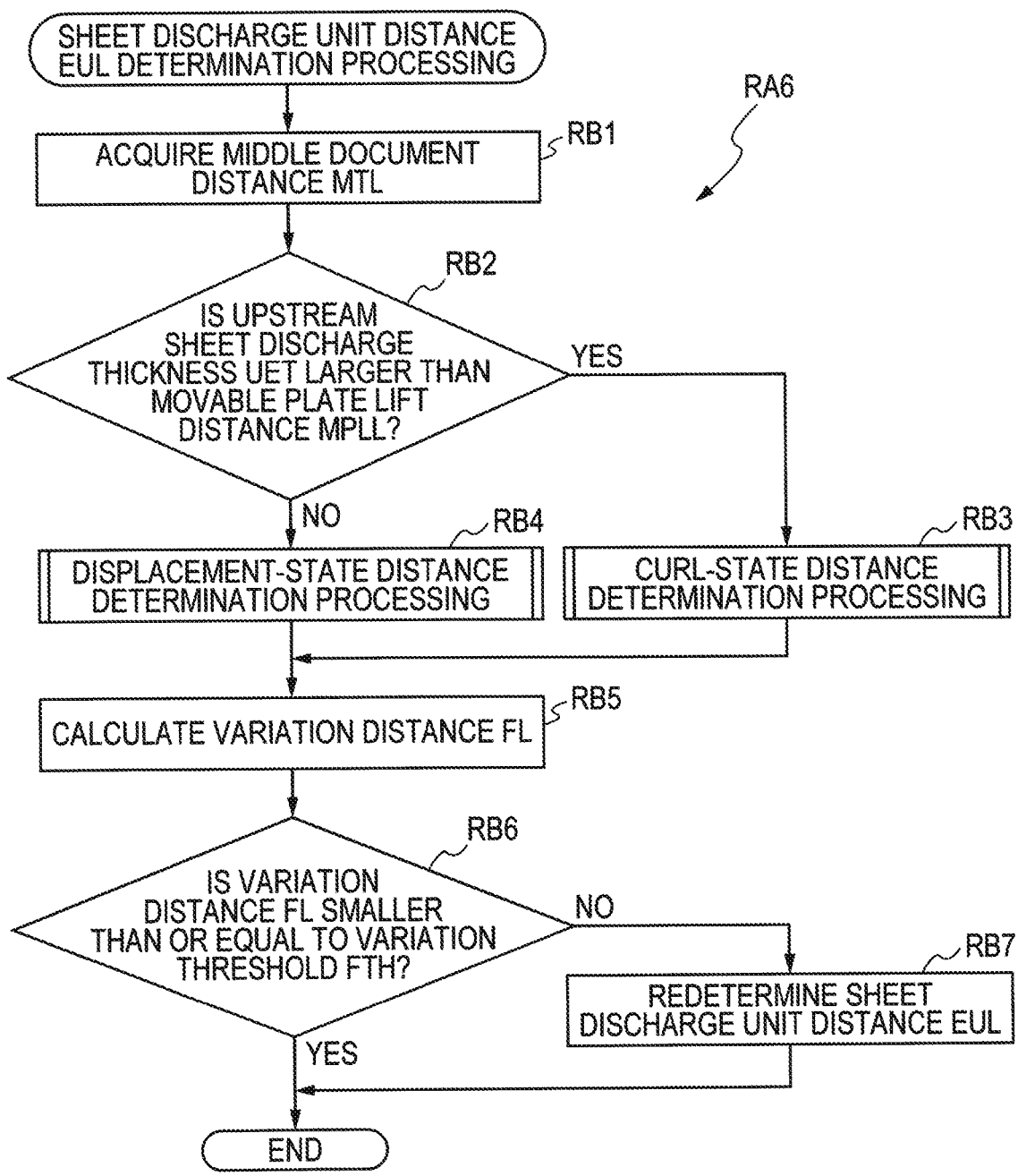
FIG. 7 is a flowchart showing sheet discharge unit distance EUL determination processing RA6.

Upon starting the sheet discharge unit distance EUL determination processing RA6 shown in FIG. 7, the CPU 40 acquires the middle document distance MTL (RB1). Specifically, the CPU 40 detects the middle document distance MTL by using the middle distance sensor 28, and stores the acquired middle document distance MTL in the RAM 42.

The CPU 40 determines whether the upstream sheet discharge thickness UET is larger than the movable plate lift distance MPLL (RB2). In response to determining that the upstream sheet discharge thickness UET is larger than the movable plate lift distance MPLL (RB2: Yes), the CPU 40 advances the processing to processing RB3. In response to determining that the upstream sheet discharge thickness UET is smaller than or equal to the movable plate lift distance MPLL (RB2: No), the CPU 40 advances the processing to processing RB4. Here, the processing RB2 is executed when the difference between the movable plate lift distance MPLL and the upstream sheet discharge thickness UET exceeds the particular range in the processing RA5 (RA5: No). Thus, the case in which a positive determination is made in the processing RB2 (RB2: Yes) corresponds to the case in which the upstream sheet discharge thickness UET is longer than the movable plate lift distance MPLL by more than the particular range (that is, the difference between the upstream sheet discharge thickness UET and the movable plate lift distance MPLL is larger than the particular range). The case in which a negative determination is made in the processing RB2 (RB2: No) corresponds to the case in which the upstream sheet discharge thickness UET is shorter than the movable plate lift distance MPLL by more than the particular range (that is, the difference between the movable plate lift distance MPLL and the upstream sheet discharge thickness UET is larger than the particular range).

When a positive determination is made in the processing RB2 (RB2: Yes), the CPU 40 executes curl-state distance determination processing (RB3). The details will be described later, and an outline will be described here. The CPU 40 determines the sheet discharge unit distance EUL based on the middle document distance MTL or the upstream document distance UTL. Upon ending the processing RB3, the CPU 40 advances the processing to processing RB5.

When a negative determination is made in the processing RB2 (RB2: No), the CPU 40 executes displacement-state distance determination processing (RB4). The details will be described later, and an outline will be described here. The CPU 40 updates the reference distance SL described later and determines the sheet discharge unit distance EUL based on the middle document distance MTL, or determines the sheet discharge unit distance EUL based on the upstream document distance UTL. Upon ending the processing RB4, the CPU 40 advances the processing to processing RB5.

Upon ending the processing RB3 or the processing RB4, the CPU 40 calculates the variation distance FL (RB5). The CPU 40 calculates a first calculation value by subtracting the reference distance SL from the sheet discharge unit distance EUL. The CPU 40 then calculates a second calculation value by subtracting the previous document distance BTL from the first calculation value. The CPU 40 then calculates a new variation distance FL by adding a value obtained by subtracting the movable plate lift distance MPLL from the second calculation value to the variation distance FL stored in the RAM 42. Alternatively, the CPU 40 may calculate, as the new variation distance FL, a value by subtracting the movable plate lift distance MPLL from the second calculation value (without adding the obtained value to the variation distance FL stored in the RAM 42).

The CPU 40 determines whether the variation distance FL calculated in the processing RB5 is smaller than or equal to a variation threshold FTH (RB6). In response to determining that the variation distance FL calculated in the processing RB5 is larger than the variation threshold FTH (RB6: No), the CPU 40 advances the processing to processing RB7. In response to determining that the variation distance FL calculated in the processing RB5 is smaller than or equal to the variation threshold FTH (RB6: Yes), the CPU 40 stores the variation distance FL calculated in the processing RB5 in the RAM 42, and ends the sheet discharge unit distance EUL determination processing RA6.

Here, the variation threshold FTH will be described. As shown in FIG. 2, the variation threshold FTH is a distance by which the sheet discharge unit 261 can move upward vertically in a state where the sheet discharge unit 261 is located at the first sheet discharge unit height EUH1 and the movable plate 213 is located at the first movable plate height MPH1.

When a negative determination is made in the processing RB6 (RB6: No), the CPU 40 redetermines the sheet discharge unit distance EUL (RB7). Specifically, the CPU 40 redetermines the sheet discharge unit distance EUL by adding a particular lift distance to the previous document distance BTL, and maintains the variation distance FL stored in the RAM 42 without storing the variation distance FL calculated in the processing RB5 in the RAM 42. In the present embodiment, the particular lift distance is also "5 mm". Upon ending the processing RB7, the sheet discharge unit distance EUL determination processing RA6 ends.

<Curl-State Distance Determination Processing RB3>

Figure 8:
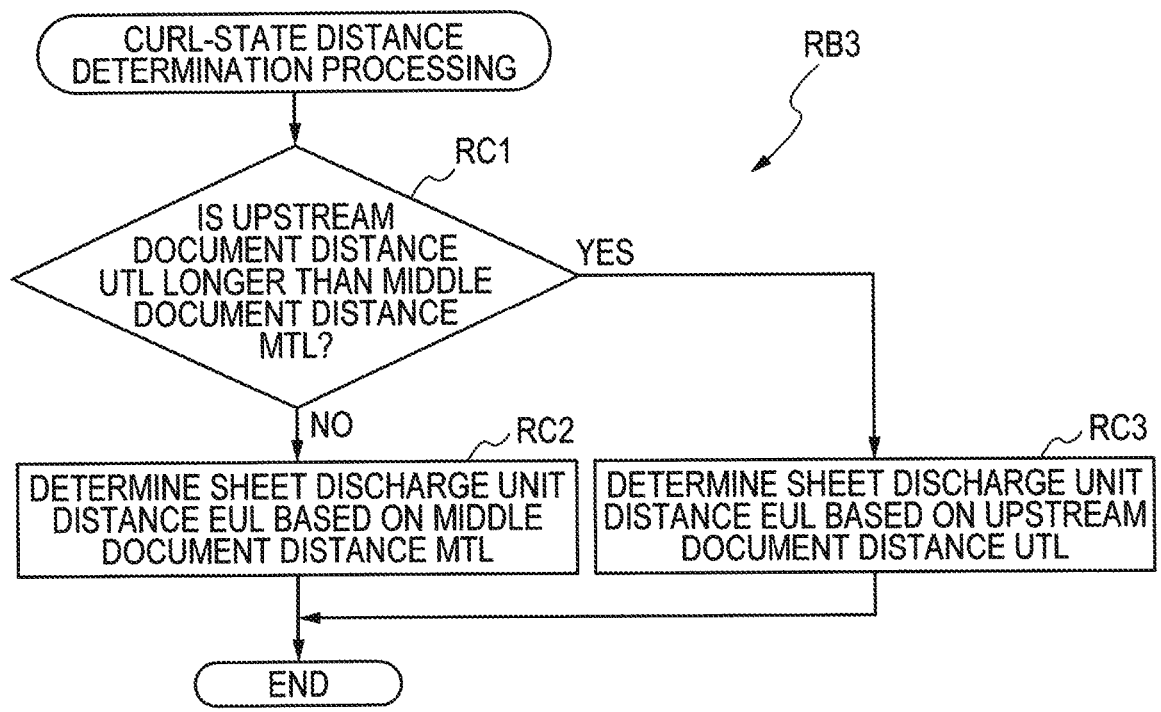
FIG. 8 is a flowchart showing curl-state distance determination processing RB3.

Upon starting the curl-state distance determination processing RB3 shown in FIG. 8, the CPU 40 determines whether the upstream document distance UTL is longer than the middle document distance MTL (RC1). In response to determining that the upstream document distance UTL is longer than the middle document distance MTL (RC1: Yes), the CPU 40 advances the processing to processing RC3. In response to determining that the upstream document distance UTL is not longer than the middle document distance MTL (RC1: No), the CPU 40 advances the processing to processing RC2.

When a negative determination is made in the processing RC1 (RC1: No), the CPU 40 determines the sheet discharge unit distance EUL based on the middle document distance MTL (RC2). Specifically, the CPU 40 determines the sheet discharge unit distance EUL by adding the reference distance SL to the middle document distance MTL. Upon ending the processing RC2, the curl-state distance determination processing RB3 ends.

When a positive determination is made in the processing RC1 (RC1: Yes), the CPU 40 determines the sheet discharge unit distance EUL based on the upstream document distance UTL (RC3). Specifically, the CPU 40 determines the sheet discharge unit distance EUL by adding the reference distance SL to the upstream document distance UTL. Upon ending the processing RC3, the curl-state distance determination processing RB3 ends.

Accordingly, even when the degree of curl (warp) of the document is different between the upstream position USP and the middle position MDP, the sheet discharge unit 261 is moved based on the document distance at an appropriate position where the document distance is longer among the upstream position USP and the middle position MDP. Thus, a document can be discharged without an occurrence of a jam.

<Displacement-State Distance Determination Processing RB4>

Figure 9:
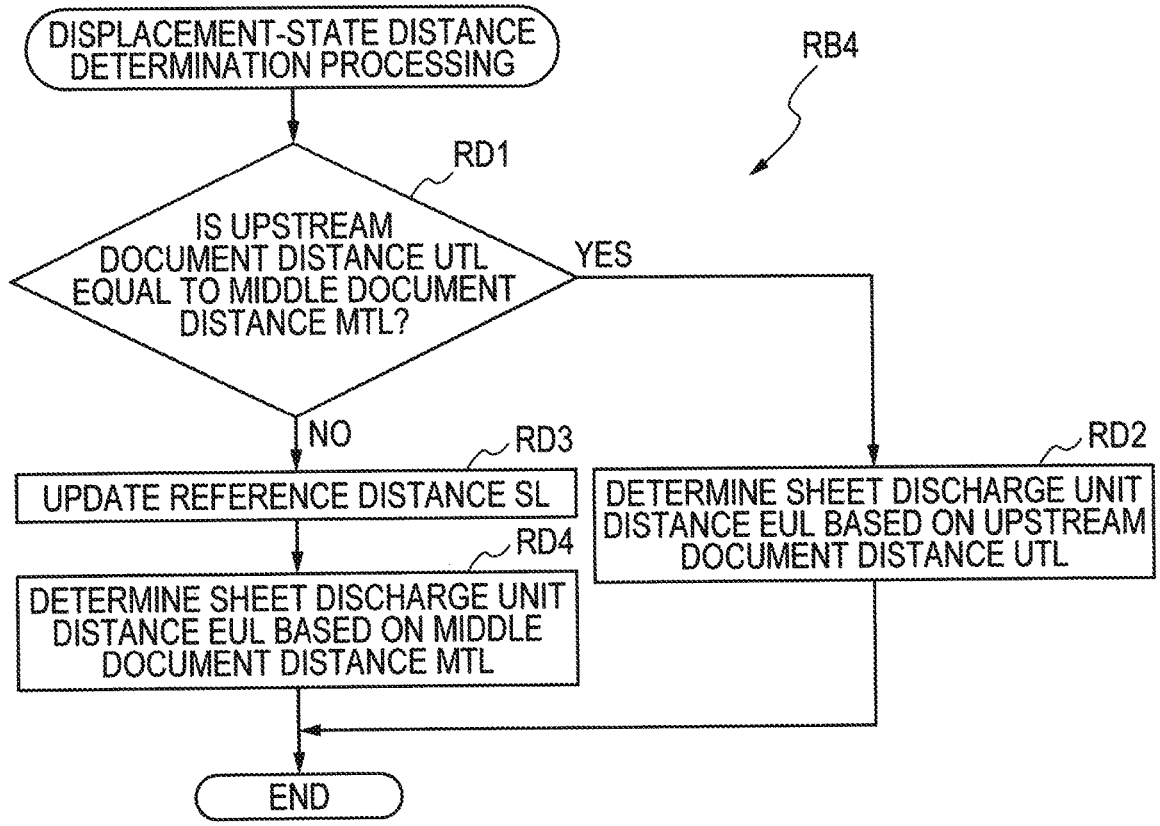
FIG. 9 is a flowchart showing displacement-state distance determination processing RB4.

Upon starting the displacement-state distance determination processing RB4 shown in FIG. 9, the CPU 40 determines whether the upstream document distance UTL is equal to the middle document distance MTL (RD1). In response to determining that the upstream document distance UTL is equal to the middle document distance MTL (RD1: Yes), the CPU 40 advances the processing to processing RD2. In response to determining that the upstream document distance UTL is not equal to the middle document distance MTL (RD1: No), the CPU 40 advances the processing to processing RD3.

When a positive determination is made in the processing RD1 (RD1: Yes), the CPU 40 determines the sheet discharge unit distance EUL based on the upstream document distance UTL (RD2). Specifically, the CPU 40 determines the sheet discharge unit distance EUL by adding the reference distance SL to the upstream document distance UTL. Upon ending the processing RD2, the displacement-state distance determination processing RB4 ends. Here, the case in which a positive determination is made in the processing RD1 (RD1: Yes) corresponds to the case in which the upstream document distance UTL is equal to the middle document distance MTL and the upstream sheet discharge thickness UET is smaller than the movable plate lift distance MPLL by more than the particular range. In this case, it is assumed that the document GS has been removed from the sheet discharge tray 4, and the sheet discharge unit distance EUL is determined based on the upstream document distance UTL. The particular range in this case is also "1 mm".

When a negative determination is made in the processing RD1 (RD1: No), the CPU 40 updates the reference distance SL (RD3). Specifically, the CPU 40 updates the reference distance SL by halving the reference distance SL.

The CPU 40 determines the sheet discharge unit distance EUL based on the middle document distance MTL (RD4). Specifically, the CPU 40 determines the sheet discharge unit distance EUL by adding the reference distance SL updated in the processing RD3 to the middle document distance MTL. Upon ending the processing RD4, the displacement-state distance determination processing RB4 ends. Here, the case in which a negative determination is made in the processing RD1 (RD1: No) corresponds to the case in which the upstream document distance UTL is shorter than the middle document distance MTL. This case corresponds to displacement that the document GS is not located at the upstream position USP but is located at the middle position MDP. In this case, in order to suppress the displacement, the sheet discharge unit distance EUL is shortened by reducing the reference distance SL to half.

<Specific Example>

Figure 10A:
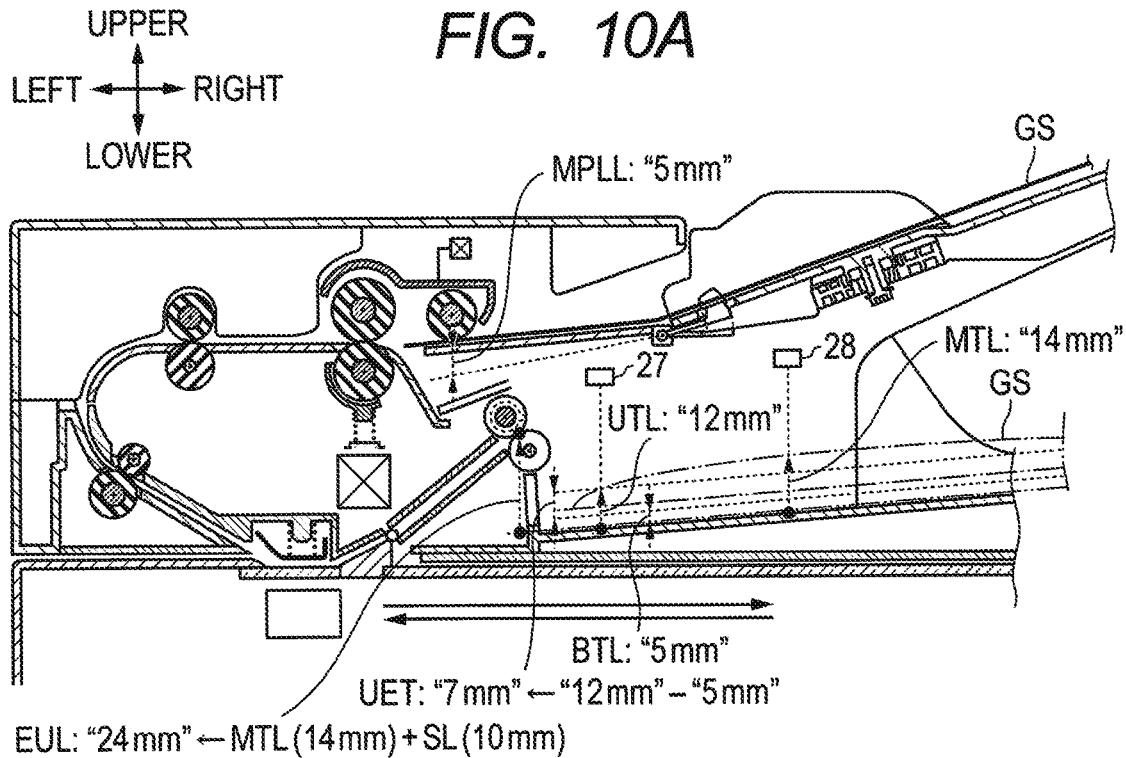
FIG. 10A is a diagram showing a sheet discharge unit distance EUL and so on when the sheet discharge tray supports a document GS that is curled.
Figure 10B:
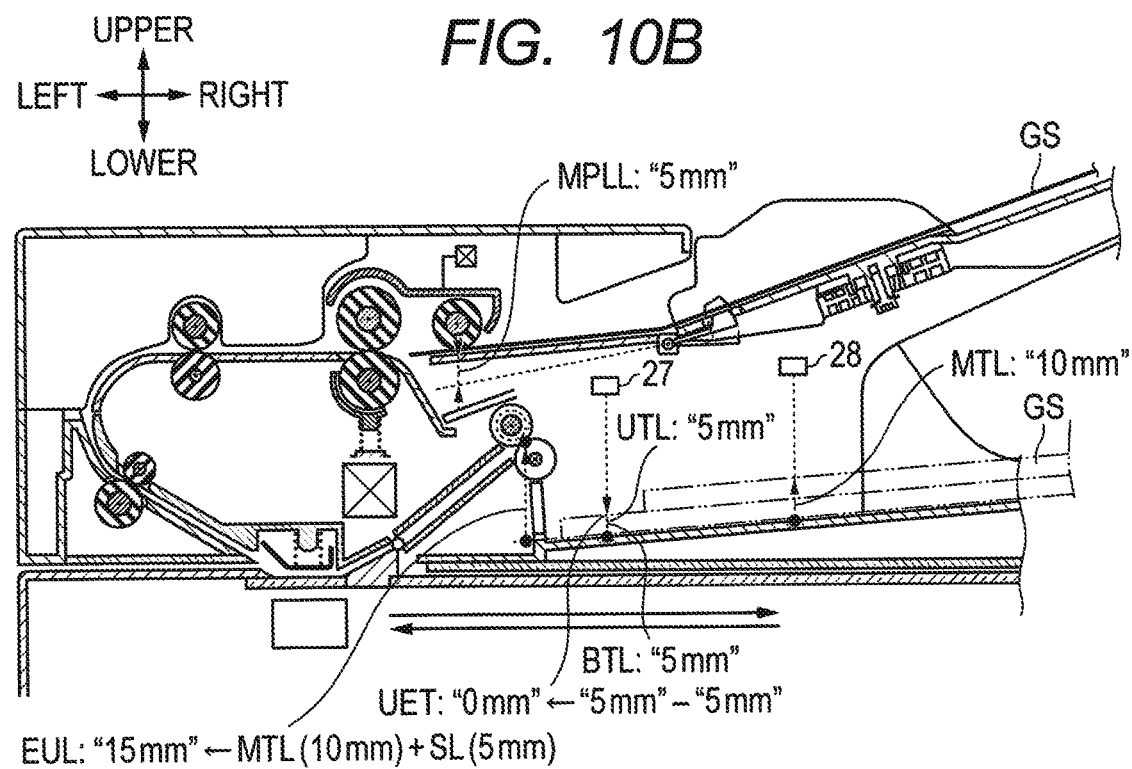
FIG. 10B is a diagram showing the sheet discharge unit distance EUL and so on when the sheet discharge tray supports documents GS that are displaced.

Specific examples of the present embodiment will be described while referring to FIGS. 10A and 10B.

A determination process of the sheet discharge unit distance EUL in a case where the sheet discharge tray 4 supports a curled document GS will be described while referring to FIG. 10A. In the image scanner 1 in FIG. 10A, the upstream document distance UTL is "12 mm" at the upstream position USP, and the middle document distance MTL is "14 mm" at the middle position MDP. The CPU 40 stores "5 mm" in the RAM 42 as the previous document distance BTL in the processing RA9 of the sheet discharge unit movement processing R4 that is previously executed.

In the processing RA2 of the sheet discharge unit movement processing R4, the CPU 40 calculates the movable plate lift distance MPLL and obtains "5 mm". The CPU 40 detects the upstream document distance UTL by using the upstream distance sensor 27, and obtains "12 mm" as the upstream document distance UTL. In the processing RA4, the CPU 40 subtracts "5 mm" that is the previous document distance BTL from "12 mm" that is the upstream document distance UTL, thereby obtaining "7 mm" as the upstream sheet discharge thickness UET. Because the difference between the movable plate lift distance MPLL and the upstream sheet discharge thickness UET is "2 mm", the CPU 40 determines in the processing RA5 that the difference is not within the particular range (RA5: No), and proceeds to the sheet discharge unit distance EUL determination processing RA6.

In the processing RB1 of the processing RA6, the CPU 40 detects the middle document distance MTL by using the middle distance sensor 28, and obtains "14 mm" as the middle document distance MTL. In the processing RB2, the CPU 40 determines that "7 mm" that is the upstream sheet discharge thickness UET is larger than "5 mm" that is the movable plate lift distance MPLL (RB2: Yes), and proceeds to the curl-state distance determination processing RB3.

In the processing RC1 of the processing RB3, the CPU 40 determines that "12 mm" that is the upstream document distance UTL is not longer than "14 mm" that is the middle document distance MTL (RC1: No), and adds "10 mm" that is the reference distance SL to "14 mm" that is the middle document distance MTL and obtains "24 mm" as the sheet discharge unit distance EUL.

A determination process of the sheet discharge unit distance EUL in a case where the sheet discharge tray 4 supports a displaced document GS will be described while referring to FIG. 10B. In the image scanner 1 in FIG. 10B, the upstream document distance UTL is "5 mm" at the upstream position USP, and the middle document distance MTL is "10 mm" at the middle position MDP. The CPU 40 stores, in the RAM 42, "5 mm" as the previous document distance BTL in the processing RA9 in the sheet discharge unit movement processing R4 that is previously executed.

In the processing RA2 of the sheet discharge unit movement processing R4, the CPU 40 calculates the movable plate lift distance MPLL and obtains "5 mm". The CPU 40 detects the upstream document distance UTL by using the upstream distance sensor 27, and obtains "5 mm" as the upstream document distance UTL. In the processing RA4, the CPU 40 subtracts "5 mm" that is the previous document distance BTL from "5 mm" that is the upstream document distance UTL, and obtains "0 mm" as the upstream sheet discharge thickness UET. Because the difference between the movable plate lift distance MPLL and the upstream sheet discharge thickness UET is "5 mm", the CPU 40 determines in the processing RA5 that the difference is not within the particular range (RA5: No), and proceeds to the sheet discharge unit distance EUL determination processing RA6.

In the processing RB1 of the processing RA6, the CPU 40 detects the middle document distance MTL by using the middle distance sensor 28, and obtains "10 mm" as the middle document distance MTL. In the processing RB2, the CPU 40 determines that "0 mm" that is the upstream sheet discharge thickness UET is not larger than "5 mm" that is the movable plate lift distance MPLL (RB2: No), and proceeds to the displacement-state distance determination processing RB4.

In the processing RD1 in the processing RB4, the CPU 40 determines that "5 mm" that is the upstream document distance UTL is not equal to "10 mm" that is the middle document distance MTL (RD1: No). In the processing RD3, the CPU 40 updates the reference distance SL to "5 mm" that is half of "10 mm" that is the current reference distance SL. In the processing RD4, the CPU 40 adds "5 mm" that is the reference distance SL to "10 mm" that is the middle document distance MTL, and obtains "15 mm" as the sheet discharge unit distance EUL.

<Effects of Embodiment>

In the present embodiment, in the processing R3 in the reading main processing, it is determined whether the sheet feed sensor 22 has changed from ON to OFF and, when the sheet feed sensor 22 has changed from ON to OFF (R3:Yes), the processing advances to the processing R4. In the processing RA2 of the processing R4, the movable plate lift distance MPLL is calculated. In the processing RA3, the upstream document distance UTL is acquired. In the processing RA4, the upstream sheet discharge thickness UET is calculated by subtracting the previous document distance BTL from the upstream document distance UTL. In the processing RA5, it is determined whether the difference between the movable plate lift distance MPLL and the upstream sheet discharge thickness UET is within the particular range and, when the difference is not within the particular range (RA5: No), the processing advances to the processing RA6. In the processing RB1 of the processing RA6, the middle document distance MTL is acquired. In the processing RB2, it is determined whether the upstream sheet discharge thickness UET is larger than the movable plate lift distance MPLL and, when the upstream sheet discharge thickness UET is larger than the movable plate lift distance MPLL (RB2: Yes), the processing advances to the processing RB3. In the processing RC1 of the processing RB3, it is determined whether the upstream document distance UTL is longer than the middle document distance MTL and, the processing advances to the processing RC3 when the upstream document distance UTL is longer than the middle document distance MTL (RC1: Yes), and the processing advances to the processing RC2 when the upstream document distance UTL is not longer than the middle document distance MTL (RC1: No). In the processing RC2, the sheet discharge unit distance EUL is determined by adding the reference distance SL to the middle document distance MTL. In the processing RC3, the sheet discharge unit distance EUL is determined by adding the reference distance SL to the upstream document distance UTL. Thus, when the upstream sheet discharge thickness UET is larger than the movable plate lift distance MPLL by more than the particular range, the sheet discharge unit distance EUL is determined based on the larger document distance among the upstream document distance UTL and the middle document distance MTL. Hence, even when the sheet discharge tray 4 supports a curled document GS and hence the upstream document distance UTL and the middle document distance MTL are long, a document can be discharged without an occurrence of a jam.

In the processing RB2, when the upstream sheet discharge thickness UET is smaller than the movable plate lift distance MPLL (RB2: No), the processing advances to the processing RB4. In the processing RD1 of the processing RB4, it is determined whether the upstream document distance UTL is equal to the middle document distance MTL and, when the upstream document distance UTL is equal to the middle document distance MTL (RD1: Yes), the processing advances to the processing RD2. In the processing RD2, the sheet discharge unit distance EUL is determined by adding the reference distance SL to the upstream document distance UTL. The case in which the upstream document distance UTL is equal to the middle document distance MTL corresponds to the case in which the document GS has been removed from the sheet discharge tray 4. In this case too, by determining the sheet discharge unit distance EUL based on the upstream document distance UTL, the sheet discharge unit 261 can be moved to an appropriate position depending on the vertical distance of the document GS supported on the sheet discharge tray 4.

In the processing RD1, when the upstream document distance UTL is not equal to the middle document distance MTL (RD1: No), the processing advances to the processing RD3. In the processing RD3, the reference distance SL is updated to a half of the reference distance SL. In the processing RD4, the sheet discharge unit distance EUL is determined by adding the reference distance SL to the middle document distance MTL. Thus, when the upstream sheet discharge thickness UET is smaller than the movable plate lift distance MPLL by more than the particular range and the upstream document distance UTL is not equal to the middle document distance MTL, the reference distance SL is updated to a half of that distance, and the sheet discharge unit distance EUL is determined based on the updated reference distance and the middle document distance MTL. In this way, when a displaced document GS is supported on the sheet discharge tray 4, the sheet discharge unit distance EUL is shortened by half of the reference distance SL. Thus, when a document is discharged next time, the document can be discharged while suppressing displacement.

The image scanner 1 and the reader 24 are non-limiting examples of an image scanner and an image sensor. The sheet feed tray 2, the sheet feed roller 211, and the sheet feeder 21 are non-limiting examples of a sheet feed tray, a sheet feed roller, and a sheet feeder. The sheet discharge tray 4, the sheet discharge unit 261, and the sheet discharger 26 are non-limiting examples of a sheet discharge tray, a sheet discharge unit, and a sheet discharger. The conveyor 20 is a non-limiting example of a conveyor. The sheet feed sensor 22 is a non-limiting example of a sheet feed sensor. The upstream distance sensor 27 and the middle distance sensor 28 are non-limiting examples of a distance sensor. The CPU 40 is a non-limiting example of a controller. The RAM 42 is a non-limiting example of a memory. The upstream distance sensor 27 is a non-limiting example of an upstream distance sensor. The middle distance sensor 28 is a non-limiting example of a middle distance sensor. The processing of the reading operation that starts in the processing R2 and that ends in the processing R6 is a non-limiting example of reading processing. The processing RA1 is a non-limiting example of movable plate movement processing. The processing RA3 or the processing RB1 is a non-limiting example of distance detection processing. The processing RA6, the processing RA8, and the processing RA7 are non-limiting examples of sheet discharge unit movement processing. The processing RA9 is a non-limiting example of distance storing processing. The processing RA4 is a non-limiting example of sheet discharge distance calculation processing. The processing RA2 is a non-limiting example of sheet feed distance calculation processing. The processing RA5 is a non-limiting example of difference determination processing. The processing RC1 is a non-limiting example of position determination processing. The processing RD1 is a non-limiting example of displacement determination processing.

While the disclosure has been described in detail with reference to the above aspects thereof, it would be apparent to those skilled in the art that various changes and modifications may be made therein without departing from the scope of the claims. Examples are provided below.

(1) The image scanner 1 of the above-described embodiment may be applied to a multifunction peripheral including a printer unit. In the above-described embodiment, the reader 24 is formed with a CIS (Contact Image Sensor). Alternatively, the reader 24 may be formed with a reduction-optical-type image sensor.

(2) In the above-described embodiment, two sensors of the upstream distance sensor 27 and the middle distance sensor 28 are used to detect the document distance, as sensors for detecting the distance from the document support surface of the sheet discharge tray 4 an uppermost document GS supported on the sheet discharge tray 4. Alternatively, a different number of sensors may be used. For example, the sheet discharge unit distance EUL may be calculated based on the document distance that is detected only by the upstream distance sensor 27, or the sheet discharge unit distance EUL may be calculated based on the document distance that is detected only by the middle distance sensor 28. Alternatively, another distance sensor different from the upstream distance sensor 27 and the middle distance sensor 28 may be arranged, and the sheet discharge unit distance EUL may be calculated based on document distances that are detected by three or more distance sensors.

(3) In the above-described embodiment, two sensors of the upstream distance sensor 27 and the middle distance sensor 28 are used to detect the document distance, as sensors for detecting the distance from the document support surface of the sheet discharge tray 4 to an uppermost document GS supported on the sheet discharge tray 4. Alternatively, a different method may be used. For example, the weight of documents GS supported on the sheet discharge tray 4 may be detected, and the document distance may be calculated based on the weight.

(4) In the above-described embodiment, when the difference between the movable plate lift distance MPLL and the upstream sheet discharge thickness UET is not within the particular range, the sheet discharge unit distance EUL is calculated based on the upstream document distance UTL or the middle document distance MTL. Alternatively, a different method may be used. For example, the sheet discharge unit distance EUL may be always calculated based on the upstream document distance UTL or the middle document distance MTL.

(5) In the above-described embodiment, in the processing RA5, it is determined whether the difference between the movable plate lift distance MPLL and the upstream sheet discharge thickness UET is within the particular range. Then, when the difference is within the particular range (RA5: Yes), in the processing RA8 the sheet discharge unit 261 is moved upward by the particular lift distance. When the difference is not within the particular range (RA5: No), the sheet discharge unit distance EUL determination processing RA6 is executed. Alternatively, the determination may be made based on a range different from "1 mm" as the particular range. For example, the particular range may be a range from a distance shorter than the movable plate lift distance MPLL by "1 mm" to a distance longer than the movable plate lift distance MPLL by "3 mm".

(6) In the above-described embodiment, in the processing RD1, it is determined whether the upstream document distance UTL is equal to the middle document distance MTL. Alternatively, it may be determined whether a difference between the upstream document distance UTL and the middle document distance MTL is within a particular range. For example, this particular range may be the variation threshold FTH, or may be a variation distance of the distance between the document support surface of the sheet discharge tray 4 and the upper surface of the document GS when a document GS is discharged to the sheet discharge tray 4.

What is claimed is:

1. An image scanner comprising:
   a sheet feed tray configured to support a document;
   a sheet feed roller configured to feed the document supported on the sheet feed tray, the sheet feed roller being configured to move vertically, the sheet feed tray including a movable plate configured to move vertically relative to the sheet feed roller;
   a sheet feed sensor configured to, by detecting a vertical position of the sheet feed roller, detect whether the sheet feed roller is in a first state in which the sheet feed roller is able to feed the document supported on the sheet feed tray or in a second state in which the sheet feed roller is unable to feed the document supported on the sheet feed tray;
   a conveyor configured to convey the document fed by the sheet feed roller to a reading position;
   an image sensor configured to read an image of the document that is conveyed by the conveyor and is located at the reading position;
   a sheet discharge unit disposed below the movable plate and configured to move vertically relative to the movable plate, the sheet discharge unit having a sheet discharge port, the sheet discharge unit being configured to discharge a document through the sheet discharge port;
   a sheet discharge tray disposed below the sheet feed tray and having a document support surface configured to support the document discharged from the sheet discharge unit;
   a distance sensor configured to detect a document distance that is a vertical distance between the document support surface and an uppermost document supported on the sheet discharge tray; and
   a controller configured to perform:
   controlling the sheet feed roller to feed the document supported on the sheet feed tray, controlling the conveyor to convey the fed document to the reading position, controlling the image sensor to read the image of the document at the reading position, and controlling the sheet discharge unit to discharge the read document to the sheet discharge tray;

in response to detecting, by the sheet feed sensor, a state change from the first state to the second state, moving the movable plate upward until the sheet feed roller changes from the second state to the first state;

after moving the movable plate, controlling the distance sensor to detect the document distance; and moving the sheet discharge unit vertically based on the detected document distance.

2. The image scanner according to claim 1, further comprising a memory, wherein the controller is configured to perform:
moving the movable plate repeatedly each time the sheet feed sensor detects the state change;

after moving the sheet discharge unit, storing the document distance in the memory as a previous document distance;

calculating a sheet discharge distance by subtracting the previous document distance from the document distance;

calculating a sheet feed distance that is a distance by which the movable plate is moved upward until the sheet feed roller changes from the second state to the first state;

determining whether a difference between the sheet feed distance and the sheet discharge distance is within a particular range;

in response to determining that the difference between the sheet feed distance and the sheet discharge distance is within the particular range, controlling the sheet discharge unit to move upward by a particular distance; and in response to determining that the difference between the sheet feed distance and the sheet discharge distance exceeds the particular range, control the sheet discharge unit to move vertically based on the document distance.

3. The image scanner according to claim 2, wherein the distance sensor comprises:

a middle distance sensor disposed at a middle position that is separated downstream in a sheet discharge direction from the sheet discharge port by a half of a particular length of a particular document, the sheet discharge direction being a direction in which a document is discharged through the sheet discharge port, the middle distance sensor being configured to detect a middle document distance that is a vertical distance between the uppermost document and the document support surface at the middle position; and an upstream distance sensor disposed at an upstream position that is farther upstream than the middle position in the sheet discharge direction and that is adjacent to the sheet discharge port in the sheet discharge direction, the upstream distance sensor being configured to detect an upstream document distance that is a vertical distance between the uppermost document and the document support surface at the upstream position;

wherein the sheet discharge unit comprises a sheet discharge roller; and wherein the controller is configured to perform:

detecting the middle document distance by the middle distance sensor and detecting the upstream document distance by the upstream distance sensor; and determining a sheet discharge unit distance based on the middle document distance and the upstream document distance, the sheet discharge unit distance being a vertical distance from the document support surface to the sheet discharge roller.

4. The image scanner according to claim 3, wherein the controller is configured to perform:

in a case where the sheet discharge distance is longer than the sheet feed distance by more than the particular range, determining whether the upstream document distance is longer than the middle document distance;

in response to determining that the upstream document distance is longer than the middle document distance, moving the sheet discharge unit upward based on the upstream document distance; and in response to determining that the middle document distance is longer than the upstream document distance, moving the sheet discharge unit upward based on the middle document distance.

5. The image scanner according to claim 3, wherein the controller is configured to perform:

in a case where the sheet discharge distance is shorter than the sheet feed distance by more than the particular range, determining whether the upstream document distance is equal to the middle document distance;

in response to determining that the upstream document distance is equal to the middle document distance, moving the sheet discharge unit vertically such that the sheet discharge port is located at a position that is separated upward from the document support surface by a distance obtained by adding a reference distance to the upstream document distance; and in response to determining that the upstream document distance is not equal to the middle document distance, moving the sheet discharge unit upward such that the sheet discharge port is located at a position that is separated upward from the document support surface by a distance obtained by adding a half of the reference distance to the middle document distance.

6. The image scanner according to claim 3, wherein the controller is configured to perform:

calculating a variation distance by subtracting the reference distance, the previous document distance, and the sheet feed distance from the determined sheet discharge unit distance;

determining whether the variation distance is smaller than or equal to a variation threshold;

in response to determining that the variation distance is smaller than or equal to the variation threshold, moving the sheet discharge unit such that the sheet discharge roller is located at a position vertically separated from the document support surface by the determined sheet discharge unit distance; and in response to determining that the variation distance is larger than the variation threshold, redetermining the sheet discharge unit distance by adding a particular lift distance to the previous document distance, and moving the sheet discharge unit such that the sheet discharge roller is located at a position vertically separated from the document support surface by the redetermined sheet discharge unit distance.

* * * * *